(12) United States Patent
Rohrer

(10) Patent No.: US 11,131,287 B2
(45) Date of Patent: Sep. 28, 2021

(54) CANTILEVERED TENSION-LEG STABILIZATION OF BUOYANT WAVE ENERGY CONVERTER OR FLOATING WIND TURBINE BASE

(71) Applicant: Rohrer Technologies, Inc., York, ME (US)

(72) Inventor: John W. Rohrer, York, ME (US)

(73) Assignee: ROHRER TECHNOLOGIES, INC., York, ME (US)

( * ) Notice: Subject to any disclaimer, the term of this patent is extended or adjusted under 35 U.S.C. 154(b) by 0 days.

(21) Appl. No.: 15/930,752

(22) Filed: May 13, 2020

(65) Prior Publication Data

US 2020/0271086 A1   Aug. 27, 2020

Related U.S. Application Data

(63) Continuation-in-part of application No. 16/153,688, filed on Oct. 5, 2018, now Pat. No. 10,788,010, which is a continuation of application No. 15/286,539, filed on Oct. 5, 2016, now Pat. No. 10,094,356, which is a continuation-in-part of application No. 14/530,723, filed on Nov. 1, 2014, now Pat. No. 9,863,395, which (Continued)

(51) Int. Cl.
*F03B 13/06* (2006.01)
*F03B 13/18* (2006.01)
*H02K 7/18* (2006.01)

(52) U.S. Cl.
CPC ........ *F03B 13/1815* (2013.01); *F03B 13/182* (2013.01); *F03B 13/186* (2013.01); *H02K 7/18* (2013.01); *F05B 2270/18* (2013.01); *Y02E 10/30* (2013.01)

(58) Field of Classification Search
CPC ........ F01D 15/10; F01D 15/20; F01B 13/264; F03B 15/00; F03B 13/18; F03B 13/14
See application file for complete search history.

(56) References Cited

U.S. PATENT DOCUMENTS 5,094,595 A * 3/1992 Labrador ............. E02B 3/062
                                                            417/332
6,595,725 B1 * 7/2003 Shotbolt ............. E21B 17/015
                                                            405/224.2

(Continued)

*Primary Examiner* — Shafiq Mian
(74) *Attorney, Agent, or Firm* — Lorusso & Associates

(57) ABSTRACT

A device to stabilize, reduce, or control the wave or wind-induced heave (vertical), surge (lateral), or pitching (rolling) motion of a floating or semi-submerged buoyant base, raft, barge, buoy or other buoyant body such as the buoyant base of a wave energy converter or a floating wind turbine base. The device concurrently allows the floating base to self-orient or weathervane to substantially maintains its orientation with respect to the direction of oncoming waves, winds, or wind gusts. The device also facilitates maintaining the submerged depth or vertical orientation of the buoyant base relative to the still water line to compensate for tidal depth changes. The device utilizes a second substantially submerged buoyant body having a center of buoyancy and at least one tensioned seabed connection located substantially below and forward or up-sea or up-wind of the center of buoyancy of the buoyant base. A structural member, which can optionally also be buoyant or integral with the base or second submerged body, connects the submerged buoyant body with the floating base.

19 Claims, 8 Drawing Sheets

Related U.S. Application Data is a continuation-in-part of application No. 14/101,325, filed on Dec. 9, 2013, now Pat. No. 9,127,640, which is a continuation-in-part of application No. 13/506,680, filed on May 8, 2012, now Pat. No. 8,614,520.

(56) References Cited

U.S. PATENT DOCUMENTS

| | | | | |
|---|---|---|---|---|
| 7,737,568 B2* | 6/2010 | Vowles | ............... | F03B 13/182 |
| | | | | 290/42 |
| 8,093,736 B2* | 1/2012 | Raftery | ............... | F03B 13/1885 |
| | | | | 290/42 |
| 8,264,095 B2* | 9/2012 | Camp | ............... | F03B 13/181 |
| | | | | 290/53 |
| 8,581,432 B2* | 11/2013 | Rohrer | ............... | F03B 13/1815 |
| | | | | 290/53 |
| 8,604,631 B2* | 12/2013 | Rohrer | ............... | F03B 13/182 |
| | | | | 290/42 |
| 8,614,520 B2* | 12/2013 | Rohrer | ............... | F03B 13/182 |
| | | | | 290/42 |
| 9,863,395 B2* | 1/2018 | Rohrer | ............... | F03B 13/182 |
| 2014/0145443 A1* | 5/2014 | Espedal | ............... | F03B 13/181 |
| | | | | 290/53 |
| 2015/0252777 A1* | 9/2015 | Rhinefrank | ............... | F03B 13/14 |
| | | | | 290/53 |
| 2017/0363058 A1* | 12/2017 | Etherington | ............... | H02K 7/075 |
| 2019/0040840 A1* | 2/2019 | Rohrer | ............... | F03B 13/182 |

* cited by examiner

CANTILEVERED TENSION-LEG STABILIZATION OF BUOYANT WAVE ENERGY CONVERTER OR FLOATING WIND TURBINE BASE

CROSS-REFERENCE TO RELATED APPLICATIONS

This application is a Continuation-In-Part of U.S. Regular Utility application Ser. No. 16/153,688, filed Oct. 5, 2018, which is a continuation of U.S. Regular Utility application Ser. No. 15/286,539, filed Oct. 5, 2016, now U.S. Pat. No. 10,094,356, issued Oct. 9, 2018, which is a Continuation-In-Part of U.S. Regular Utility application Ser. No. 14/530,723, filed Nov. 1, 2014, now U.S. Pat. No. 9,863,395, issued Jan. 9, 22018, which is a Continuation-In-Part of U.S. Regular Utility application Ser. No. 14/101,325, filed Dec. 9, 2013, now U.S. Pat. No. 9,127,640, issued Sep. 8, 2015, which is a Continuation-In-Part of U.S. Regular Utility application Ser. No. 13/506,680, filed May 8, 2012, now U.S. Pat. No. 8,614,520, issued Dec. 24, 2013, the contents all of which are incorporated in their entirety herein by reference.

FIELD OF THE DISCLOSURE

This disclosure relates to an improved means to stabilize a floating or semi-submerged apparatus, such as a floating wave-energy-converter (WEC) base or a floating offshore wind-turbine (FWT) base, against undesirable wave or wind-induced motion including heave, surge and/or pitching motions. Such undesirable motions can reduce the effectiveness or energy capture efficiency of floating renewable wave or wind-energy capture devices. The disclosure is not limited to WEC or FWT bases and may be utilized to motion-stabilize other floating or semi-submerged bases, platforms or rafts. More particularly, the disclosure relates to an improved means of motion controlling or stabilizing floating or semi-submerged bases for combined WECs and FWTs. The disclosure also relates to improved combinations of WECs and WTs that use a common stabilized base.

BACKGROUND OF THE DISCLOSURE

Ocean waves are produced by offshore winds. Waves near the ocean surface typically have 5-10 times the energy density (kw/m$^2$) of offshore winds that produce such waves. The offshore wind-energy resource has higher energy content and is more consistent than terrestrial winds. Offshore wind farms are now the major source of renewable power capacity additions in Europe where unsubsidized offshore wind power is now competitive with fossil fuel alternatives. The 30 MW Block Island Wind Farm is the first and only operating U. S. offshore wind farm to date. Almost all large offshore wind farms to date have been deployed in water depths below 50 meters where seabed fixed bases (mono-piles, jacket structures, or tripods) are feasible. The vast majority of U. S. and global offshore wind resources are in water depths of over 50 meters where floating base wind turbines (FWTs) are required. The only commercial global deep-water wind farm deployed to date is the 30 MW Hywind Scotland farm by Equinor. Most floating base deep-water deployable wind turbine bases utilize one of 3 primary configurations; mono-spar buoy, multi-spar semi-submerged, or tensioned-leg platforms (See FIG. 1).

Wave energy is also a huge global renewable energy resource but, despite its higher energy density, lags offshore wind development with no large utility-scale-wave energy farms yet commercially deployed. This is due both to the profusion of distinctly different proposed means of converting ocean waves into electrical power and to the high capital cost (CapEx) per installed megawatt (MW) of those primitive early generation WECs which have been scaled-up and ocean-deployed to date. WECs also have unique marine design challenges. Ocean wave energy is most concentrated on the ocean surface and decreases exponentially with depth, thereby making it most desirable to deploy WECs on the surface. Wave energy, however, is proportional to wave height squared. A WEC designed for peak output in 4-meter (significant wave height) seas must survive (or avoid) 16 times higher structural loads during occasional severe winter storms that produce wave heights 4 times higher than the 4-meter design wave height.

By combining WECs and offshore wind turbines, whether of the fixed or floating base type, the cost of the combined power output can potentially be lowered by not only using a common base but by also using common mooring systems, inter-array and array-to-shore sea-cables, and using common operating and maintenance resources. Numerous combined FWT-WEC devices have been proposed but most utilize the combination to improve or mask the poor economic prospects of WECs with intrinsically high CapEx/MW. Combining a specific economically viable WEC design with an FWT can be especially promising if both can synergistically share an affordable, effective wave-and-wind-motion-stabilized base or frame with improved motion stabilization as achieved with the present disclosure.

All WECs require at least one first active body, typically a buoyant float or flap, and a second reaction body or mass, typically a second floating body, a frame, a base, a platform, or a shoreline or seabed-affixed frame, tower, or base, or the seabed itself. Wave energy is captured from the wave-induced relative motion, between the first active body and the second reaction body that drives a power take-off (PTO) device such as an electric generator, a hydraulic pump, or an air turbine.

It is highly desirable to stabilize FWTs against wave, wind or wind-gust-induced pitching motions. Most current and proposed FWTs use horizontal axis turbines. Significant deviation of their rotational axes from the oncoming, substantially-horizontal wind direction produces a reduction in wind turbine energy capture efficiency. Vertical heaving or lateral surging movement of the FWT base will generally result in a lesser, though still significant, reduction in wind turbine efficiency.

WEC wave energy capture efficiency is also substantially reduced by unwanted wave or wind-induced heave (vertical), surge (lateral), and/or pitching (rotational) motion of the WEC reaction body (which can be a floating or semi-submerged frame, base, raft, or platform). Such unwanted wave or wind-induced reaction-body motion will substantially reduce the relative motion between a WEC's first or active body (such as a flap or a float) and the WEC's reaction body. Because captured wave energy is the product of the relative motion between the active and reactive body times the resistive force (applied by the generator or other power take-off means) between the two (or more) bodies, any reduction in the relative motion between the bodies (caused by wave-induced heave, surge, and/or pitching motion of the reactive body) reduces wave energy capture.

One way of motion-stabilizing the floating or semi-submerged base or reaction body of FWTs or WECs is to make them massive. This can be done by the sheer weight of the metal (or concrete) used to fabricate them which can be further enhanced by integral or attached water ballast tanks or drag plates that capture or entrain additional seawater mass (as shown in FIG. 1 Semi-Submersible). Unfortunately, the fabricated marine steel, aluminum, fiberglass, and/or concrete utilized in such massive FWT or WEC bases often makes the bases more massive and expensive than their wind turbines or WEC floats or flaps that do the actual energy capture work.

Wind and wave energy resources may be free, but the capital required to capture and convert these renewable resources into usable power is not free. The cost of ocean-energy-produced power (often referenced as the LCOE or Levelized Cost of Energy) is primarily determined by the installed capital cost or expense (CapEx)/unit of output or CapEx/MW) required to capture, convert and deliver it. Even FWT and WEC operating and maintenance expenses are a relatively fixed percent of their CapEx.

The seabed itself can also be utilized as part of the base or reaction-body mass to stabilize FWT and WEC bases or reaction bodies. The Tension Leg Platform shown in FIG. 1 utilizes three tensioned cables affixed to the seabed to stabilize a buoyant, fully-submerged platform to which a wind turbine tower is mounted. The seabed is certainly massive and immobile, but the large buoyant platform with its three tensioned legs are not without substantial mass or CapEx. The three tensioned leg cables and their secure attachments to the seabed are also not without costs. These tension legs must be able to withstand tidal changes in platform-submerged depth and severe "snap loads" from occasional, but severe, sea conditions that produce waves up to 15 meters in height that slacken and then suddenly re-tension these cables.

Objects of the Disclosure

The descriptions and operating principles of the present disclosure focus primarily on the stabilization of FWT bases, WEC floating bases, or combined FWT and WEC devices that utilize a common floating, semi-submerged, or buoyant base by use of at least one up-sea, substantially submerged, cantilevered mooring beam connected to a substantially submerged, buoyant mooring buoy connected to the seabed by at least one tensioned leg or cable. The disclosure also includes application of these components and principles to stabilize other buoyant, semi-submerged, moored platforms or bases from undesirable wave or wind-induced motions.

One object of the disclosure is to provide an effective means to motion-stabilize or motion control an FWT base, WEC base, a combination FWT-WEC base or other floating platform or base from undesirable wave or wind-induced motion while minimizing the structural mass and CapEx of such platform or base. Another object of the disclosure is to provide a mooring system for a motion-stabilized base that enhances such base stabilization against wave or wind-induced motion. Yet another object of the disclosure is to effectively utilize the gyroscopic effect of a rotating FWT to further stabilize the FWT or combined FWT-WEC base against wind gust or wave-induced aft-ward pitching or other undesirable motion.

Another object of the disclosure is to provide a base mooring system that allows a WEC, FWT, combined FWT-WEC base, or other floating base to pivot or swivel in a horizontal plane around a mooring point or buoy to self-orient or weather-vane into oncoming wave fronts to either improve base stabilization or to increase WEC capture efficiency by allowing the WEC to intercept maximum oncoming wave-front width. Such a mooring system concurrently enhances the motion stabilization of such a base.

Yet another object of the disclosure is to provide a base mooring system that allows a WEC, FWT, or combined FWT-WEC base to pivot or swivel in a horizontal plane around a mooring point or buoy to self-orient or weather-vane into oncoming wave fronts or wind gusts while extending the fore-to-aft dimension of such a single or multiple-base float by utilizing the disclosed mooring beam. Such an elongated fore-to-aft dimension spans a significant portion of oncoming wave lengths and thereby reduces fore-to-aft pitching of such a base or frame.

A further object of the disclosure is to provide a WEC, FWT, combined WEC-FWT base or other floating-base mooring system that provides self-orientation of such base into oncoming wave or wind about a mooring or pivot point or buoy, and concurrently provides base motion stabilization by utilizing one or more tensioned cables between the seabed and such mooring or pivot point. Such a base is pivotably connected to such a mooring point by a semi-rigid mooring beam that is rigidly connected to such a base.

A still further object of the disclosure is to provide a WEC, FWT, combination WEC-FWT base or other floating-base mooring system with at least one mooring beam and at least one tensioned cable from the seabed to a submerged mooring point. The chosen length of such mooring beam and the chosen depth of such mooring point is chosen such that the moment produced about the mooring point by wave surge (lateral) forces and optionally by wind forces or loads acting upon such base, and upon any WEC or FWT attached to such base, is at least partially countered by the opposing moment about such mooring point produced by wave heave (vertical) forces or loads acting upon such base, and upon any WEC or FWT attached to such base.

Another object of the disclosure is to provide a combination WEC-FWT, wherein the WEC is comprised of one or more adjacent surface floats oriented or self-orienting towards prevailing or oncoming wave fronts, which floats, individually or in combination, have a wave-front width, or beam, substantially exceeding their fore-to-aft depth, excluding appendages. Such float(s) are connected to a common WEC-FWT base by one or more swing or drive arms at a pivot point within, or attached to, such base substantially below the still water line (SWL) and substantially aft (down-sea) of the center of buoyancy of such float(s). Such a base is pivotably connected by an elongated mooring beam to a forward (up sea) mooring point or buoy connected to the seabed by at least one tensioned cable. These and other objects of the disclosure will become apparent from a reading of the following summary and detailed description of the disclosure and a review of the accompanying drawings.

SUMMARY OF THE DISCLOSURE

In one aspect of the disclosure, it is desirable to have a floating base or platform such as a WEC base, FWT base, or combination WEC-FWT base motion-stabilized or controlled against wave or wind-induced motions. It is further desirable to have such bases be as light-weight and inexpensive (low CapEx) as possible. Multiple tensioned leg or cable connections between the base and the seabed can provide supplemental seabed stabilization mass for such a base but will restrict desirable self-orientation (weather-vanning) of the base and any attached WEC device. WEC self-orientation is desirable because it allows wide-beam WEC surface floats to intercept maximum wave-front-containing wave energy per unit of float volume, mass, and cost (CapEx). Multiple tension legs attached directly to such floating or semi-submerged bases are also of limited effectiveness against lateral motion stabilization induced by wave surge (lateral) forces or lateral winds and gusts. To maximize wave-energy-capture efficiency, WECs must absorb a majority of both heave and surge wave-energy components, each of which is equal to exactly half of the total wave energy in deep water, which makes WEC base lateral motion stabilization essential. Multiple tension-leg-moored bases or floats do not compensate for tidal changes in the still water level or line (SWL), which change can change the submerged depth of such bases and significantly reduce the efficiency and effectiveness of WECs that utilize such bases as their reaction body.

The disclosure provides a relatively low-mass, low-CapEx, effectively motion-stabilized or motion controlled floating or semi-submerged base or platform that can be utilized as an FWT base, WEC base, or combination FWT-WEC base. Undesirable, excessive base-stabilization mass is reduced by pivotably connecting the base to an up-sea submerged mooring buoy or pivot point that utilizes an elongated mooring beam rigidly attached (cantilevered) to the base. The mooring buoy is attached to the seabed by at least one tensioned leg (or cable). The up-sea horizontal pivoting attachment between the elongated mooring beam and the submerged mooring ball or pivot point allows any WEC surface floats on the motion-stabilized, low-mass base to remain self-oriented (weather vanning) into oncoming wave fronts, which maximizes intercepted wave-front width, and may allow self-orientation of one or more FWTs on such a base. The elongated, cantilevered mooring beam of the disclosure also allows for significant tidal SWL adjustment because the mooring beam length can be substantially longer than the tidal range, which is particularly necessary for WECs.

Because the mooring buoy or pivot point is submerged substantially below the SWL and restricted from upward vertical motion by at least one seabed affixed tensioned cable, wave-(and wind or wind gust)induced lateral forces applied against the base, and any FWT or WEC attached to such base, produce an aft-ward base-pitching moment about a the mooring buoy pivot point. Waves under the base also concurrently attempt to heave the base upward that produces an opposing forward-pitching moment. By judiciously selecting the mooring beam length and the mooring buoy submerged depth, wave-surge-(or wind-)induced aft pitching can be substantially or fully cancelled by wave-heave-induced forward pitching.

The disclosure has additional novel and unique synergistic advantages when a combined WEC-FWT is combined with the disclosed stabilized base. The rotational inertia of an FWT on a base enhances base stabilization against pitch (gyroscopic effect). Adjustment of the mooring beam length or base seawater ballast allows optimum FWT horizontal axis adjustment. The mass of the FWT on top of its tower substantially increases the moment of inertia and increases the natural frequency of the combined FWT and base substantially reduces wave-induced aft pitching, which, in turn, increases the WEC float-to-base relative motion and energy-capture efficiency, especially for large waves and long-wave periods where most WECs struggle.

Base pitch, heave stability and attitude of the disclosed apparatus can be further enhanced by admission or discharge of seawater ballast from at least one cavity within the base or by using one or more substantially horizontal or vertical-plane drag plates affixed to, or extending from, the base. An optional inclined shoaling plane mounted on the mooring beam, preferably such that it does not interfere with WEC float rotation, also enhances base motion stability while increasing wave height and WEC capture efficiency. Embodiments of the present disclosure utilize a concave WEC float aft wall, which together with any lower extension thereof, and with optional WEC float side plate aft extensions, further reduce base aft pitching. This concave rear float wall, approximately concentric about the drive arm pivot point, fully eliminates or substantially reduces generation of any aft or back waves during the float's movements, which back wave generation would otherwise substantially reduce WEC wave-energy capture efficiency.

In another aspect of the disclosure, a semi-submerged substantially vertical mono-spar is utilized as the base. An upward extension of such a mono-spar provides the necessary vertical tower for at least one FWT. Use of this mono-spar base, when dimensioned with an appropriate width, allows the floats to rotate a complete 360° past the mono-spar base, above or below the float drive-arm pivot point, without physical interference between the floats, drive arms, and mono-spar base. This eliminates the severe-seas "float-to-base end-stop collision problem" that almost all other WECs that utilize surface floats must overcome. During severe sea conditions, the mono-spar base configuration also allows the floats, with their elongated drive arms, to be rotated and fully submerged well below oncoming storm-wave troughs and well below the drive-arm pivot point. Float submergence can be further facilitated by flooding the floats with seawater ballast to reduce their buoyancy.

Distinguishing Features from the Relevant Art

Most proposed FWT-WEC combinations combine one of the three basic FWT floating bases shown in FIG. 1 with early-generation, intrinsically-high-CapEx, low-capture-efficiency WECs such as Oscillating Water Columns (OWCs), ring buoys, other axis-symmetric buoys, or hinged surge flaps. OWCs and axis-symmetric buoys capture primarily surge wave energy while surge flaps capture primarily surge wave energy, each representing only half of the total wave energy in still water. Few, if any other proposed FWT-WEC combinations describe the use of more advanced multi-capture-mode WECs. No other FWT bases, WEC bases, or other marine bases, rafts, or platforms disclose the cantilevered mono-spar, motion-stabilized base of the disclosure. No other proposed FWT-WEC combinations describe the use of any self-orienting, wave-front-parallel, broad-beam, multi-capture-mode WECs or the WEC described in U.S. Ser. No. 16/153,682, of which this application is a continuation-in-part.

Self-orienting, wave-front-parallel, broad-beam WECs have the advantage of intercepting more energy-containing wave front per cubic meter, tonne, and cost of WEC float(s) utilized. FIG. 2 shows the Floating Power Plant (FPP) of Denmark, which represents one of several dozen proposed combinations of FWTs and WECs. It is one of the few FWT-WEC combinations that self-orients (weather vanes) into oncoming wave fronts. This combination FWT-WEC, like most FWT-WEC combinations, utilizes a common massive and costly semi-submerged frame, base or platform (resulting in high CapEx/MW) made up of multiple connected buoyant, semi-submerged bodies, similar to the relevant art Spar-Submersible FWT base shown in FIG. 1. The FPP utilizes multiple slack mooring lines and thus cannot utilize seabed mass to supplement more expensive frame or base mass like the apparatus of the disclosure.

The FPP WECs have float pivot points forward (up-sea) of the float center of buoyancy and at (or above) the SWL (unlike the aft pivot points substantially below the SWL of the disclosure). This WEC configuration results in substantially lower inherent wave-energy-capture efficiency because the energy capturing floats cannot move concurrently both upwardly and rearwardly on each wave crest and return downwardly and forwardly into each successive wave trough to thus capture both heave and surge wave energy for maximum capture efficiency. The FPP also lacks the concave float back of the disclosure, which prevents undesirable generation of back waves, which further reduces wave energy capture efficiency. The FPP WEC floats cannot rotate 360° without interference and are not submergible below wave troughs like the apparatus disclosed herein. Absent the ability to rotate freely about 360°, the FPP WEC floats are subjected to both severe sea end-stop collisions and other damage as they attempt to survive severe storms on the ocean surface.

Referring now to FIG. 3, a WEC is shown identical to the WEC embodiment shown in FIG. 5 U.S. application Ser. No. 16/153,682, of which this application is a Continuation-in-Part. This WEC frame or base includes a single substantially vertical buoyant spar (mono-spar) designated concurrently as 100, 20, rigidly connected to a lateral forward-protruding (cantilevered) mooring beam 107 connected at its up-sea or forward end to a buoyant (shown submerged) mooring buoy 112, which mooring buoy is connected to the seabed by at least one tensioned leg cable 110. FIG. 3 describes the only WEC, FWT base, or other float or platform that incorporates a single cantilevered mooring beam and tension leg that allows self-orientation of the WEC into oncoming wave fronts. The length of the lateral mooring beam 107 and the elevation of its up-sea connection point to mooring buoy 112 establishes favorable concurrently-opposing, heave-and-surge-induced moments about 112 that substantially reduce or eliminate wave-induced heave, surge, and pitching motion of the mono-spar frame 100, 20.

The WEC apparatus known as the Solo Duck was inspired by the original Salter Edinburgh Duck of the late 70's. The Solo Duck utilizes a single asymmetric cam-shaped wide float that surrounds a stationary cylindrical reaction body. The original Duck utilized multiple adjacent floats. The Solo Duck float, like its predecessor the Salter Duck, moves both upwards and aft-wards in response to oncoming wave crests. The cylindrical base or reaction body must be kept relatively stationary as the float rotates about it for large relative motion necessary for acceptable energy capture. One proposed configuration of the Solo Duck uses two arms that protrude downwardly from the cylindrical reaction body—each arm is connected to the seabed using tensioned cables or legs. Unlike the apparatus of the disclosure, the Solo Duck configuration does not provide self-orientation (weather-vaning) of the WEC into oncoming wave fronts and lacks the ability to maintain a constant submerged depth of the reaction body during tidal changes to the SWL. It also is ineffective in stabilizing the massive cylindrical reaction body against wave heave-and-surge-induced motion and was, therefore, replaced by a single large area drag plate located substantially below the reaction body and connected to it as explained in Numerical and Experimental Study of the Solo Duck Wave Energy Converter, Energies, 21 May 2019, Wu, Yao, Sun, Ni, and Goteman.

DETAILED DESCRIPTION OF THE DISCLOSURE

Figure 1:
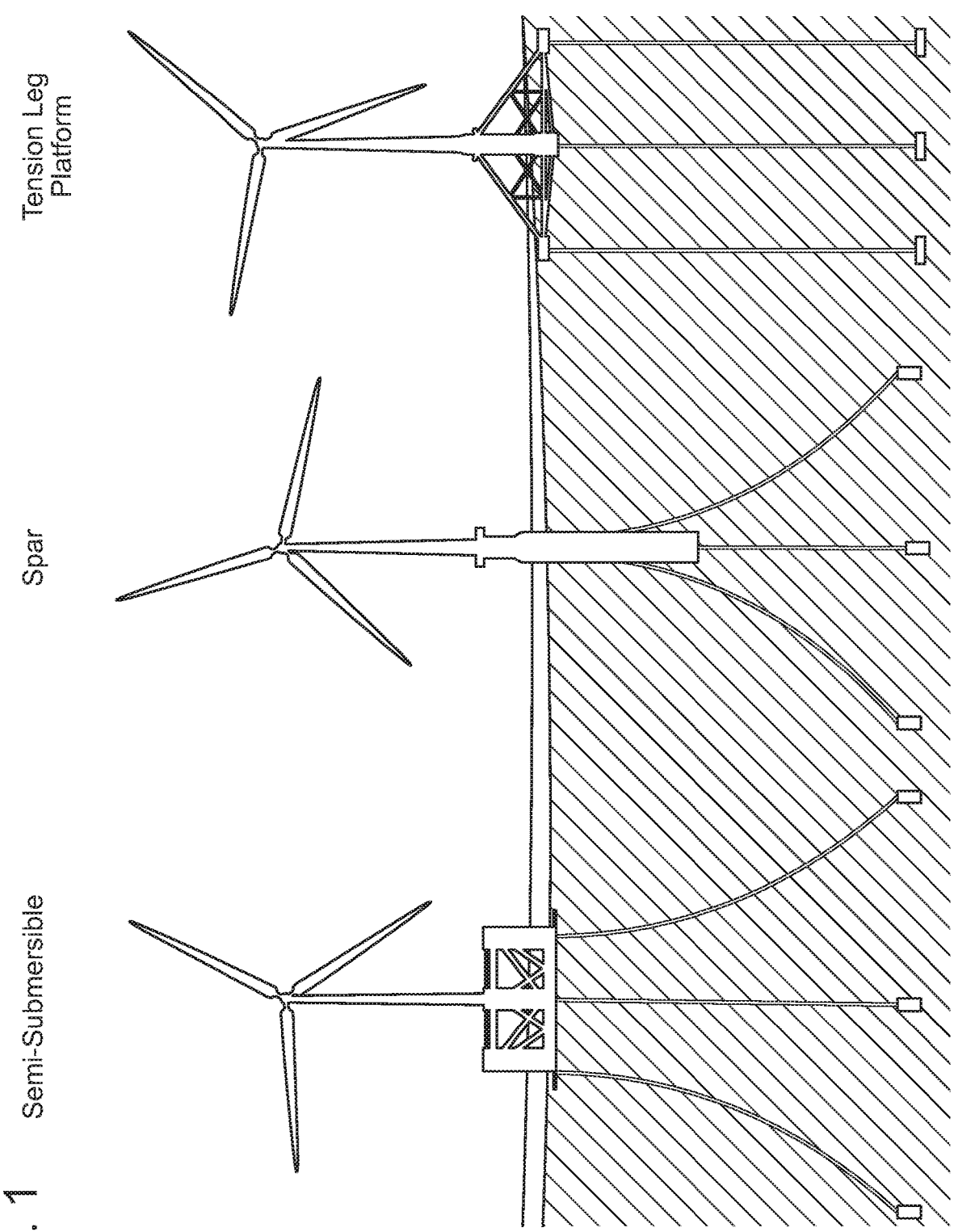
FIG. 1 are isometric views, both above and below a still water line, of three relevant art apparatuses.

Referring now to FIG. 1, three of the most generic proposed FWT bases are illustrated, the Semi-Submersible, the Spar (Buoy or Mono-Spar), and the Tension Leg Platform, respectively from left to right. The Spar-Buoy is employed by Equinor in their Hywind Scotland project using five 6 MW FWTs. It utilizes a buoyant semi-submerged elongated vertical spar, with a typical submerged depth of ⅓rd to ⅔rds the length of the above SWL wind turbine tower. The submerged spar section is typically of hollow construction with at least the lower portion having one or more cavities for the admission (and expulsion) of seawater ballast. High density solid ballast (typically metal or concrete) is usually placed at or near the bottom to maximize the distance between the center of buoyancy and the center of gravity (including the mass of the wind turbine and its tower) for improved pitch stability. The Spar-Buoy semi-submerged base is slack moored via multiple cables.

The Semi-Submersible is comprised of multiple, vertically-oriented semi-submerged hollow spars (typically three) commonly constructed of marine steel or steel reinforced marine concrete. Like the prior Mono-Spar, internal seawater ballast is used to increase mass and/or to level the wind turbine tower attitude and to compensate for wind or wave-induced pitching. Because its multiple interconnected vertical spars do not protrude as deeply into the water column as the Mono-Spar, a horizontal-plane drag plate or plane is commonly placed on the bottom of each spar to reduce vertical heaving of the Spar-FWT assembly. The FWT tower is commonly located either between the multiple spars or above one of them. Each of the semi-submerged vertical spars is slack moored via multiple cables. It thus cannot utilize seabed mass for stabilization and is not self-orienting.

Lastly, the Tension Leg Platform commonly has three or four seabed-affixed tensioned legs or cables to maintain a majority of the buoyant platform at a submerged depth below the SWL and anticipated wave troughs. Tension Leg Platforms are used extensively for oil and gas exploration and production platforms. Moreover, other relevant art apparatuses place one or more FWTs on large-surface-area floating barges (or surface platforms made from multiple interconnected floating bodies). WECs also can be attached to these barges.

Figure 2:
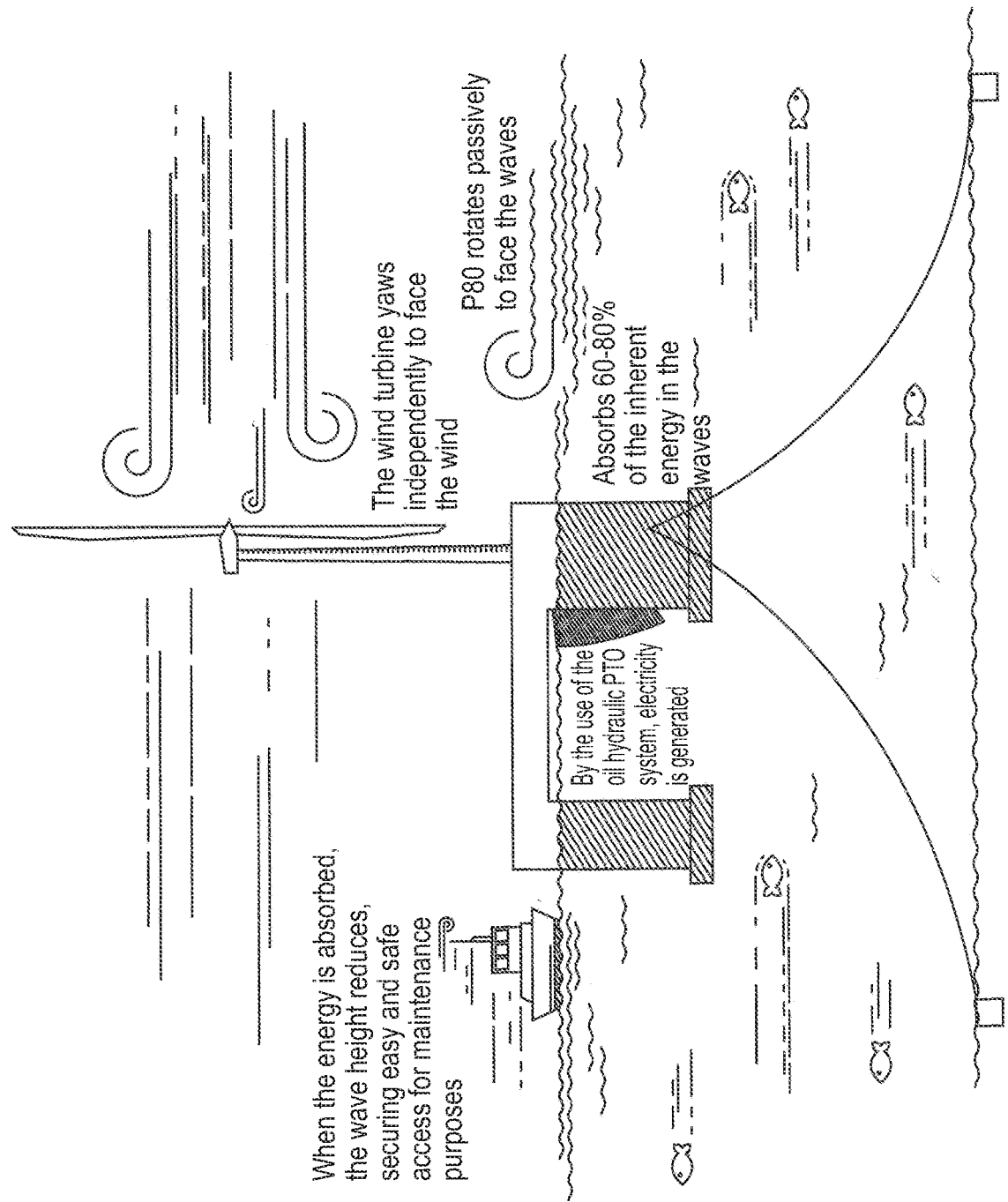
FIG. 2 is a side view in elevation of the relevant art Floating Power Plant (FPP) of Denmark (P37 or P80 model), an FWT-WEC combination that utilizes a large buoyant multi-body base or platform to which one or more FWT and WECs are attached.

Referring now to FIG. 2, a schematic of the Danish Floating Power Plant P80 is shown as derived from the floatingpowerplant.com website. Many combinations of WECs and FWTs have been proposed (no large-scale commercial units are yet operating), with most combining one of the generic FWT base designs shown in FIG. 1 above with one of the generic early generation WEC designs, e.g., Oscillating Water Column (OWC), Surge Flaps, Vertically-heaving Buoys, or Articulating Floats. Almost all use axis-symmetric WEC configurations that capture wave energy from any oncoming wave direction. Most typically capture only a portion of one mode of wave energy (heave or surge, but not both) with each mode contributing exactly ½ of the total wave energy in deep water. Axis-symmetric WECs capture substantially less wave energy than WECs, like those of the disclosure that self-orient (or weather-vane) such that all of their energy-capturing floats or elements are parallel to oncoming wave fronts.

The P80 is one of the few WEC-FWTs that self-orient but the structure used to accomplish the self-orientation—slack mooring (no tension leg secured to the seabed for added stabilization—is patentably distinct from the disclosure. The P80 is further distinguished from the disclosure due to the use of trailing (aft) floats hinged near the SWL to produce substantial energy-reducing "back waves" rather than the fore-positioned floats, of the disclosure, which are hinged substantially below the SWL (so that they move concurrently both upwardly and aft-ward on each wave crest), with concave float back walls to prevent generation of energy-robbing "back-waves".

Figure 3:
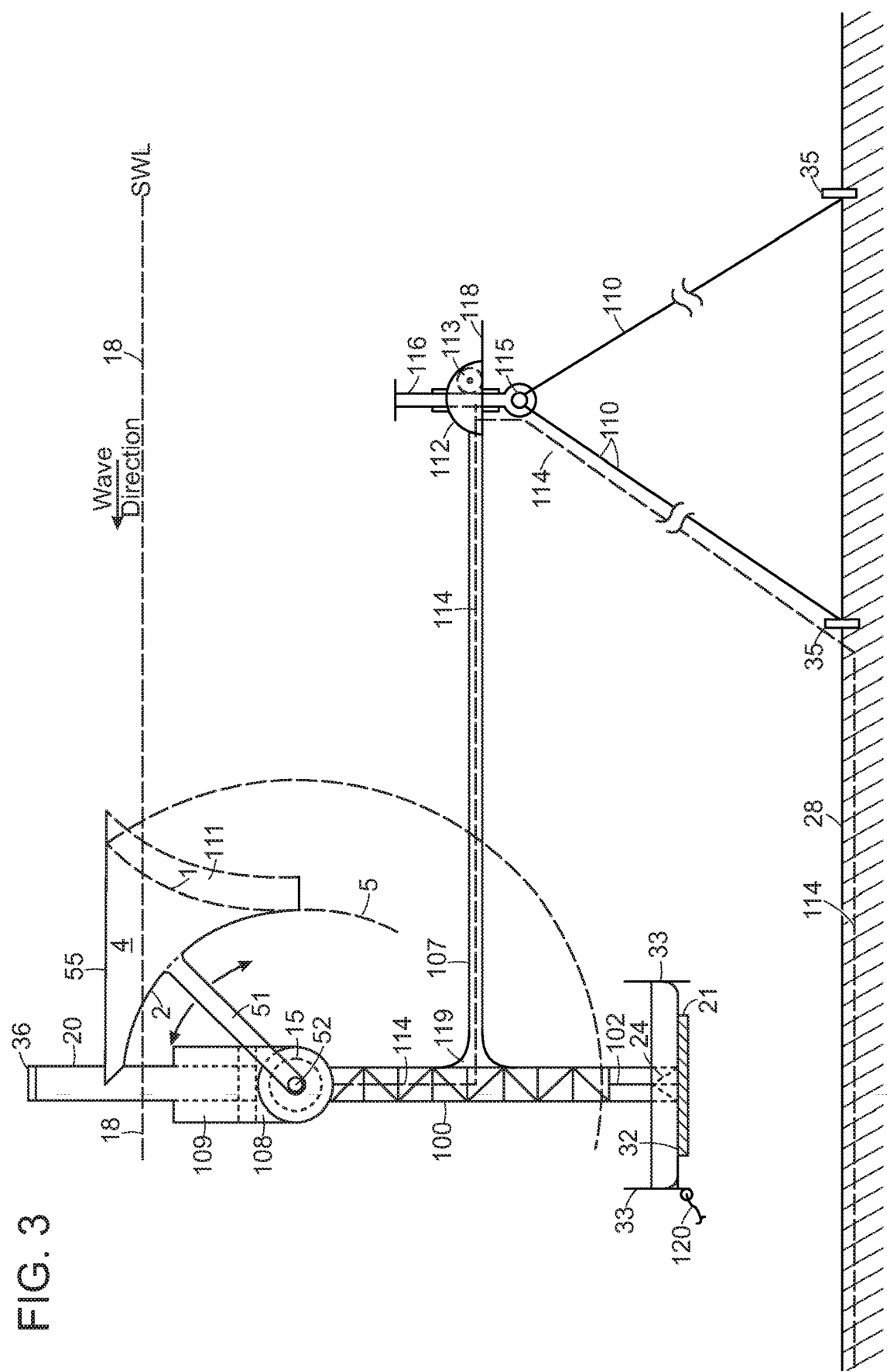
FIG. 3 is a side view in elevation of a WEC according to the embodiment disclosed in FIG. 5 of U.S. application Ser. No. 16/153,682.
Figure 5:
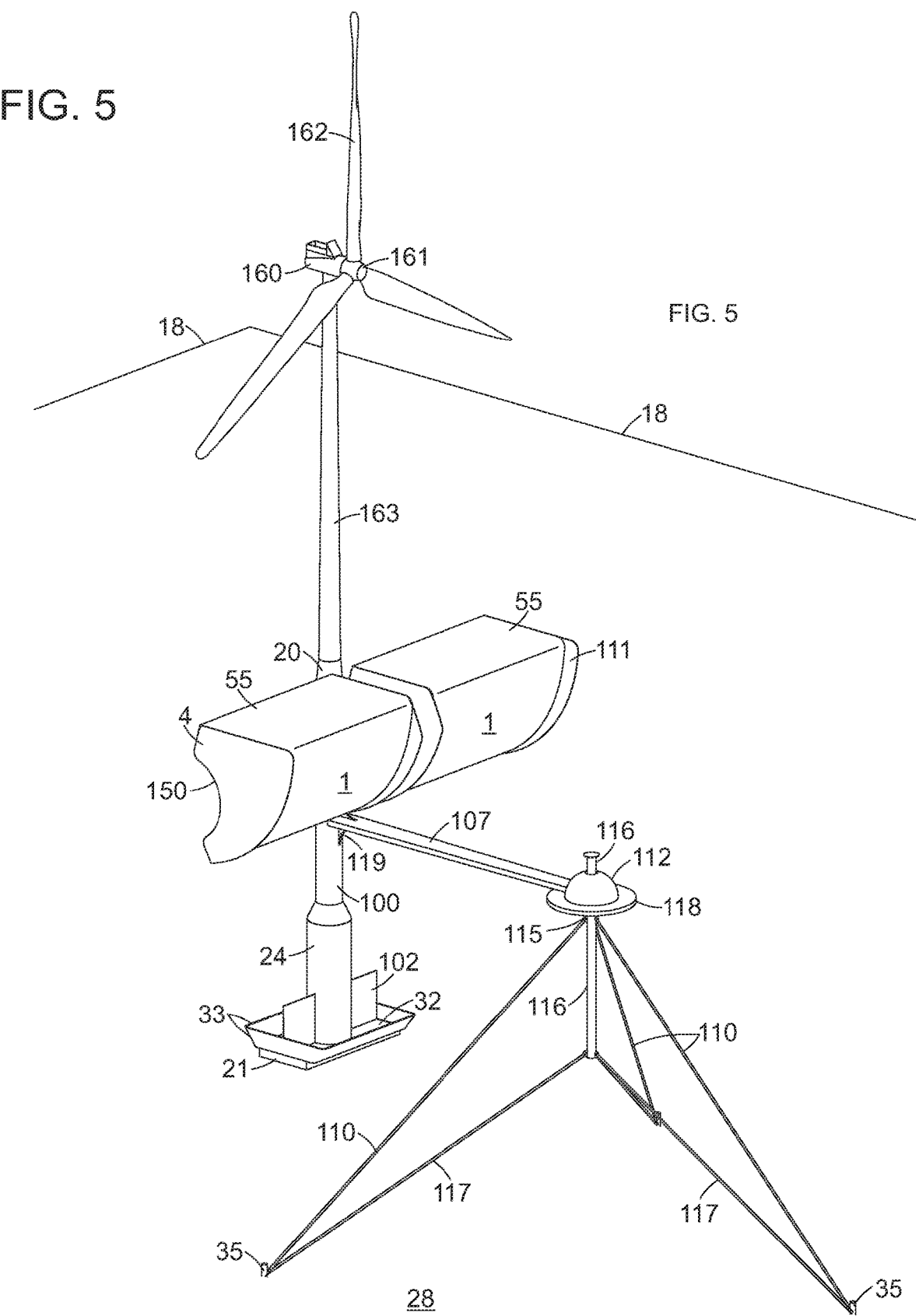
FIG. 5 is an isometric view of a combined FWT-WEC apparatus according to one embodiment of the disclosure utilizing the cantilevered tension leg of the present disclosure utilized to motion stabilize a mono-spar semi-submerged base. Optional horizontal and/or vertical drag plates are utilized at or near the bottom of the base and on the mooring buoy. Optional secondary tensioned mooring lines are attached near the bottom of a spar extending below the mooring buoy.

Referring now to FIG. 3 (which is also FIG. 5 of U.S. application Ser. No. 16/153,688), a WEC according to one embodiment of the disclosure is shown. The WEC has a float or buoyant body 4 partially submerged below the Still Water Line (SWL) 18. The float is connected by at least one swing or drive arm 51 to a pivot point or rotational axis or axel 52 that provides a rotational input into an electric generator or other power take-off (PTO) device 15 to produce useful energy or work. PTO 15 is integral with, or affixed to, a substantially vertical spar frame (designated concurrently as 20, 109, 100) (top to bottom, respectively), which spar frame together with its lower drag plates (designated concurrently as 32, 33, 102), and their entrained seawater mass plus gravity weight 21 provide at least a portion of the WEC's second body reaction mass. Line 120 provides an optional slack secondary mooring line that prevents the WEC from rotating a complete 360° around submerged mooring ball 112 and wrapping around power and communications cables 114.

All WECs require a reaction mass or second body to resist the wave-force-induced force against, and motion of, the at least one primary or first body to do work or capture energy (work or energy capture equals force times distance or torque times rotation angle). While the WEC second body reaction mass can be provided by one or more of the WEC bodies, such as massive platforms, barges, or rafts, these high-mass or high-horizontal-plane surface area reaction bodies require large quantities of steel, concrete or gravity mass ballast, which results in high WEC capital expense per unit output (CapEx/MW). Using seawater as ballast in tanks or seawater entrained with drag plates attached to WEC reaction bodies is somewhat less expensive. Utilizing the seabed as part or all of the WEC reaction mass provides the highest mass and best WEC reaction body stability (no motion) with the lowest CapEx/MW even for deep-water-deployed WECs that use long tensioned cables.

The WEC embodiment shown in FIG. 3 uses the seabed as a reaction mass to supplement the second body mass to stabilize the second body frame or base against undesirable motion. Seabed 28 is connected to the frame or base secondary body by one or more tensioned cables 110 or tensioned legs anchored at piling points 35 that maintain a buoyant mooring body or buoy 112, mounted on a substantially vertical mooring shaft 116, at a fixed depth. A structural mooring beam 107 is rigidly attached to the mono-spar frame 100, 109, 108, 20 at connection point 119.

While mooring beam 107 is structural, it or its connection at 119 can provide some flexibility to reduce the "snap" or shock loading on tensioned cable(s) 110 when a severe wave load applied against float 4 and resisted by power generator 15 applies an aft-ward pitching moment to the mono-spar frame or base 100, 108, 109, 20. This places a counter-clockwise moment on mooring beam 107 through mooring ball 112 and mooring spar 116 to tensioned mooring cable(s) 110. Shock or snap loads can also be reduced or dampened by placing a spring or damping member or link (not shown) at either end of, or along, the tensioned leg or cable 110. Alternatively, shock or snap loads may be reduced or dampened by incorporating a shock-dampening connection (not shown) at mooring-beam-to-frame connection point 119. Routing of the power export and communications/control cables 114 goes from the PTO 15 housing, to and along mooring beam 107, down tensioned cable 110, through seabed attachment means 35, along seabed 28 and back to shore.

While FIG. 3 shows a mono-spar frame, alternatively, two mooring beams (each like mooring beam 107) also can be rigidly mounted at 119 to a twin spar frame (as shown in FIG. 1 of U.S. patent application Ser. No. 16/153,688) and converge at, or before, submerged mooring float 112. When vertical (heave) and lateral (surge) wave forces from each oncoming wave crest both lift upwardly and rotate rearwardly, respectively, float 4, such rotation is resisted by the damping torque applied by PTO 15 within, or affixed to, spar frame 100 (lower section), and 20 (upper section). Frame section 109, which can be located above (as shown) or below (not shown) generator 15, provides supplemental frame or base flotation.

If the mono-spar frame or base 20, 100 is permitted to pitch aft-ward by the PTO damping torque, the relative motion between drive arm 51 and the frame-mounted PTO 15 is reduced which, in turn, reduces wave energy capture. If lateral movement of mooring buoy 112 is problematic, the angle between the fore cable 110 and a horizontal plane can be reduced by increasing the fore cable 110 length.

Horizontal drag plate 32 with vertical surface 33, limits the upward vertical displacement of PTO pivot point or axis 52, which displacement also reduces the relative rotation (and energy capture) between drive arm 51 and PTO 15. Chamber 24 can hold additional seawater ballast while plate 21 provides additional solid ballast mass, if needed. The upward vertical displacement forces imparted on Frame 100 and 20 and on PTO input pivot point 52, when wave heave (vertical) forces are applied against float 4, are significantly reduced, or even eliminated, by the counter-clockwise moment about mooring buoy 112 provided by the concurrent lateral wave forces applied against float 4 front face 1 and transmitted through, and resisted by, PTO 15. The need for vertical drag plate 102, which further reduces wave-surge-force-(lateral) induced motion of the mono-spar frame 20, 100 and attached PTO input point 52 is, likewise, reduced or eliminated. Elimination, or substantial reduction in size, of these drag plate surfaces 33, 32, 102 results in further substantial WEC CapEx cost reductions.

Because the lateral beam 107 to frame 100 connection is semi-rigid, compensation for tidal changes to the SWL will produce changes to both the vertical orientation of the spar frame 100 and 20, and mooring beam 107. If these changes are excessive, they can be easily accommodated by allowing mooring buoy 112 to slide vertically on vertical mooring mounting spar or shaft 116 that utilizes a hydraulic, electrical, or mechanical device 113 to allow slow (i.e. hourly) movement of the mooring buoy 112 up or down mooring spar 116 but does not allow such movement during typical short 5-20 second-wave-period, wave-force-induced motions. Alternatively, the connection between lateral beam 107 and mooring buoy 112 can be hinged to allow vertical plane pivoting or hinging (not shown). Slack secondary aft mooring line 120 can be utilized to prevent the WEC device from completely circling mooring buoy 112 which would either wrap power export and communications cables 114 or require slip ring electrical connections.

While FIG. 3 shows a motion-stabilized WEC base or first reaction body, like use of mooring beam 107, mooring buoy 112, and at least one seabed-affixed tensioned member 110, applies motion stabilization of other buoyant surface or semi-submerged bodies including FWT bases or other platforms. Furthermore, while FIG. 3 shows a rigid connection between mooring beam 107 and the first buoyant or reaction body 100, 20 at location 119, the connection can be spring-like or at least one spring-like, energy-absorption or storage element can be located within 119, within mooring beam 107, or along the length of the at least one tensioned member 110, such that the rebound from prior wave-induced aft pitching, heaving, or lateral motion of first body 100, 20 is delayed or controlled until the next wave has applied at least a substantial portion of its pitching, heaving, and lateral forces against the first body. This rebound delay reduces or cancels the wave-induced base or reaction body motion of the prior wave.

Figure 4B:
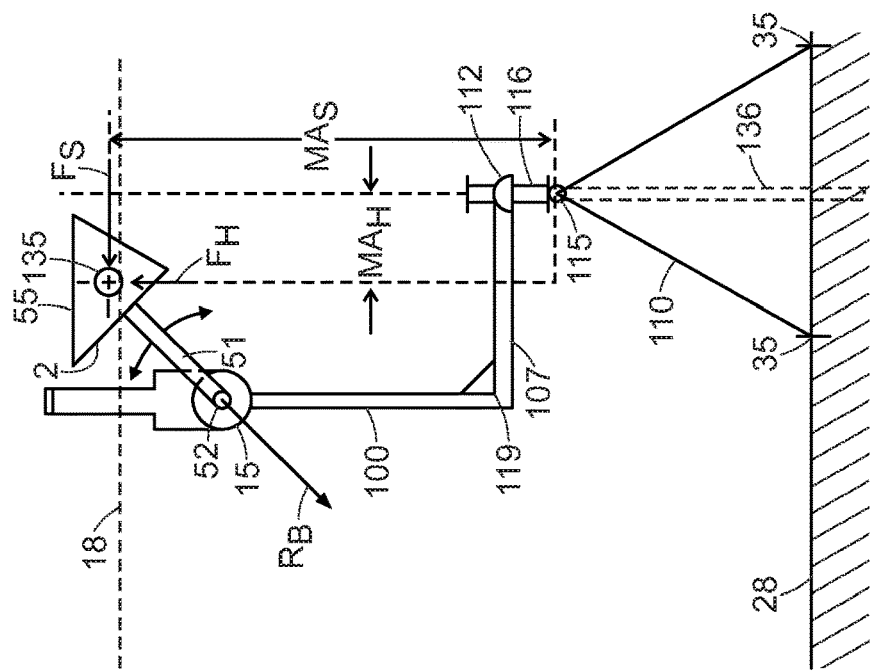
FIG. 4B is a side view in elevation of a WEC according to the embodiment shown in FIG. 8A of U.S. patent application Ser. No. 16/153,682 that includes a shorter mooring beam length and deeper mooring ball submerged depth producing a smaller vertical heave wave force moment about the mooring ball and a larger lateral surge force moment about the mooring ball.
Figure 4A:
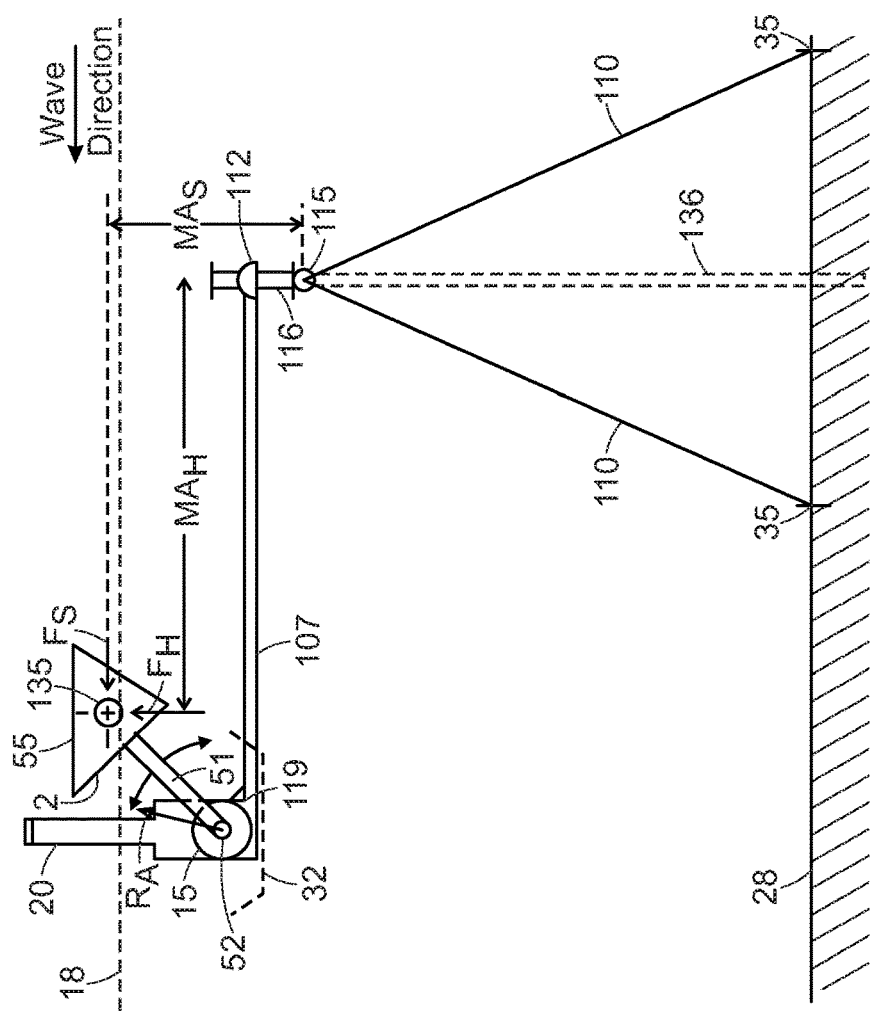
FIG. 4A is a side view in elevation of a WEC according to the embodiment disclosed in FIGS. 8A and 8B of U.S. application Ser. No. 16/153,682 that includes a longer mooring beam and shallow mooring ball submerged depth producing a larger vertical heave wave force moment and smaller lateral surge wave force moment about the mooring ball.

Referring now to FIGS. 4A and 4B, a WEC, according to another aspect of the disclosure, is shown having the same features as the embodiment shown in FIG. 3, including the rigid vertical-spar-frame-to-mooring-beam connection at junction 119, but with horizontal drag plate 32 (in phantom) optionally eliminated. FIGS. 4A and 4B illustrate how unwanted wave-heave-force-induced vertical displacement of PTO input axis 52 and unwanted counter-clockwise rotational (pitching) displacement about PTO input axis 52 can be substantially or totally eliminated without the use of large ballast mass or large drag-plate areas by optimizing the dimensions of lateral beam(s) 107 and vertical frame spar(s) 100.

The heave (vertical) and surge (lateral or horizontal) forces acting on the center of buoyancy 135 and the forward wave-impacting face 1 of float 4, respectively, during each wave cycle, will change wave-to-wave, but these two forces are comparable since heave and surge wave-energy components are identical in deep water waves. If, as shown in FIG. 4A, mooring beam 107 and the lateral distance to the center of buoyancy of float 4 is long relative to pivot point 115 at or below mooring ball 112, then the heave moment arm $MA_H$ that produces unwanted vertical upward translation of PTO input axis 52 will be large compared to the countering surge moment arm $MA_S$. The resultant force vector and translation of PTO axel 52, shown as vector $R_A$, will be upward as shown in FIG. 4A, which is undesirable, will reduce the relative motion between drive arm 51 and PTO input axel 52. If, on the other hand, as shown in FIG. 4B, the vertical distance from pivot point 115 to the float 4 center of buoyancy is large relative to their lateral distance, then the surge moment arm $MA_S$ will be large relative to the heave moment arm $MA_H$ and the PTO input axis will move downwardly and rearwardly with each wave crest, which is the opposite result of FIG. 4A.

The orientation of lower frame spar 100 and mooring beam 107 need not be at right angles, as shown, and can be combined into a single inclined or curvilinear beam (not shown) without change to the heave or surge moment arms. Between the results of the apparatuses shown in FIGS. 4A and 4B, the disclosure utilizes an optimum ratio of $MA_H/MA_S$, by selecting both an optimum submerged depth of mooring buoy 112 and its pivot point 115 and an optimum mooring beam 107 length, which establishes the optimum lateral distance between the float 4 center of buoyancy 135 and the mooring buoy 112 pivot point 115 such that both the translation and pitch rotation of PTO input axis 52 is minimized throughout the average wave cycle for maximum wave-energy-capture efficiency. The length of mooring beam 107 can be made adjustable to accommodate seasonal variations in average wave height and period. Changing the applied PTO 15 resistive or damping torque throughout each wave cycle will also change the heave and surge moments during each cycle.

Referring now to FIG. 5, in another aspect of the disclosure, a motion-stabilized buoyant base or frame serves as a common base or frame for both a WEC, and an FWT. The WEC is similar in configuration those shown in FIGS. 3 and 4, as indicated by the reference characters shared in common. Features in FIG. 5 that differ from the features shown in FIGS. 3 and 4 include access hatch 36, which is relocated to an alternate position (not shown), and a wind turbine tower 163, which is placed on top of upper mono-spar frame section 20. Wind turbine nacelle 160 contains the wind turbine generator, gearbox (if utilized), power electronics, and turbine yaw (directional) mechanisms. A wind turbine hub 161 has 3 turbine blades 162 and inputs rotational power to the generator or gearbox within nacelle 160. Nacelle 160 can be oriented (swiveled in horizontal or vertical planes) independent of tower 163 although optionally—especially on smaller scale embodiments—a fixed nacelle-to-tower orientation can be used which allows the WEC to self-orient into combined oncoming wave fronts and wind directions which are usually, though not always, similar. Because the lateral wind forces applied against the wind turbine and its base, and the lateral forces applied against the WEC, may be from different directions and with different average forces, the self-orienting (weather-vaning) direction will be the vectored result of the wind and wave lateral forces.

In this combination FWT-WEC embodiment, it is necessary to have the center of buoyancy of the combined FWT-WEC base well above its center of gravity (including wind turbine tower head mass, 160, 161, 162 and tower 163) for hydrodynamic stability. This determines the length of mono-spar sections 100 and 24 and the required gravity mass 21. Addition of this substantial wind turbine mass and its high tower greatly increases the moment of inertia of the combined wind turbine with mono-spar base. This increased moment of inertia substantially increases the natural hydrodynamic pitch frequency of this combined mono-spar FWT-WEC base.

Most WEC reaction bodies (unless they are huge, massive, and expensive), have reaction body masses with natural frequencies well below the 5-15 second wave periods common to ocean waves and swells. The significant increase in the moment of inertia attained by adding the wind turbine tower-head and tower mass to the WEC base as shown in FIG. 3, greatly increases the combined FWT-WEC base pitch-rebound natural frequency. This delays pitch rebound until after the WEC at least one float is being concurrently driven upwardly and aft-ward by the next wave which increases the float-to-base relative motion, and hence energy capture. Desirable mono-spar frame pitch stability is further enhanced by the gyroscopic effect of the rotating wind turbine and its hub and generator. In all embodiments of the disclosure, with or without wind turbine 160, it is desirable to maximize the moment of inertia (and natural frequency) of the base or frame by utilizing gravity mass or water ballast mass or drag-plate-entrained seawater mass located distant from the base's or frame's center of mass.

Located below lower mono-spar base section 100 is an enlarged section 24 that has a larger cross-sectional area than the area of a main section of base section 100 that can be fully or partially filled with seawater or other ballasts (as per section 24 in FIG. 3). In this embodiment, an optional circular substantially horizontal-plane drag plate 118 may be added below mooring buoy 112 to prevent downward displacement of buoy 112. The buoyancy of mooring buoy 112, supplemented by the buoyancy of mooring shaft 116, usually will be sufficient to prevent the one or more tension legs or cables 110 from becoming slack, allowing buoy 112 to move downward and preventing frame 100, 20 with FWT tower 163 from pitching forward during certain wind or sea conditions. In this or other embodiments of the disclosure, mooring buoy 112 can be an integral part of mooring beam 107. Beam 107, or attachments thereto, also can provide additional floatation (not shown) that supplements the floatation of mooring buoy 112.

Figure 6:
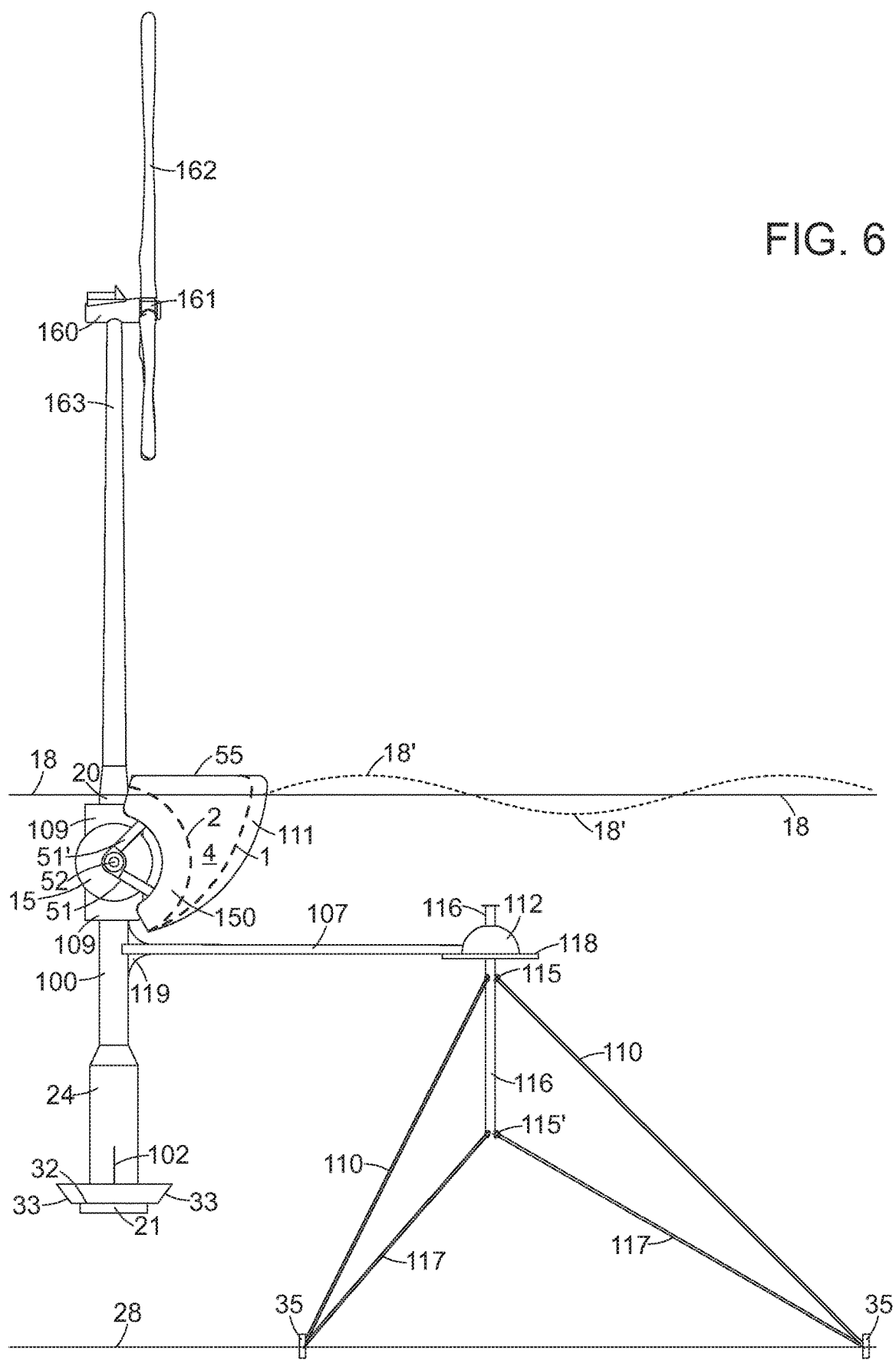
FIG. 6 is a side view in elevation of the combined FWT-WEC apparatus shown in FIG. 5.

Referring now to FIG. 6, which shows a side elevation view of the combined WEC-FWT embodiment shown in FIG. 5, the side walls of floats 4 have optional forward extensions 111 and aft extensions 150 each configured to reduce undesirable water flow (spillage) around the side edges of float 4. Both the still water line (SWL) 18 and incoming waves 18' above and below the SWL (dotted line) are shown. Also shown is the upper and lower extensions of mooring buoy shaft 116, which mooring buoy shaft 116 may be buoyant or non-buoyant, with secondary tensioned mooring lines or cables 117. An extension of mooring spar 116 can reach, and be affixed to, the seabed (not shown). Alternatively, an existing or purposed seabed-affixed pole, spar, piling or tower can serve the function of a seabed-affixed mooring spar 116.

Lower drag plate surfaces 32, 33, 102 can be reduced in size or totally eliminated by either increasing the submerged depth of the bottom of lower spar frame sections 100, 24 (which section 24 also serves as a seawater ballast tank), or by increasing the mass of gravity weight 21, which lengthens the natural pitch period (and moment of inertia) of the spar frame such that its forward pitch rebound (from the prior wave) continues as the float 4 is being both lifted and driven aft-ward by the next ensuing wave. This increases the relative motion between float and frame and resultant energy capture. Alternatively, or in addition, the flexural response of mooring beam 107 or its connection 119 to vertical spar frame 100 can be constructed such that the pitch rebound of the spar frame is dampened or delayed by the use of shock absorbers or energy-absorbing (visco-elastic) materials in either the mooring spar 107 or its connection 119 with spar frame 100.

It is desirable in all embodiments of the present disclosure to minimize the cross-sectional area of that portion of frame or base 20 above flotation section 109 near the SWL 18 (commonly referred to as its "water plane area") as the base water plane area establishes wave-induced buoyant (heave or vertical) forces applied against the base that results in undesirable base vertical displacement. It also is desirable in all embodiments to minimize the frontal area of base components 20, 109, and 15, near the SWL to reduce wave-induced lateral surge forces that would otherwise produce significant aft-ward and/or pitching motions of the frame or base.

Figure 7:
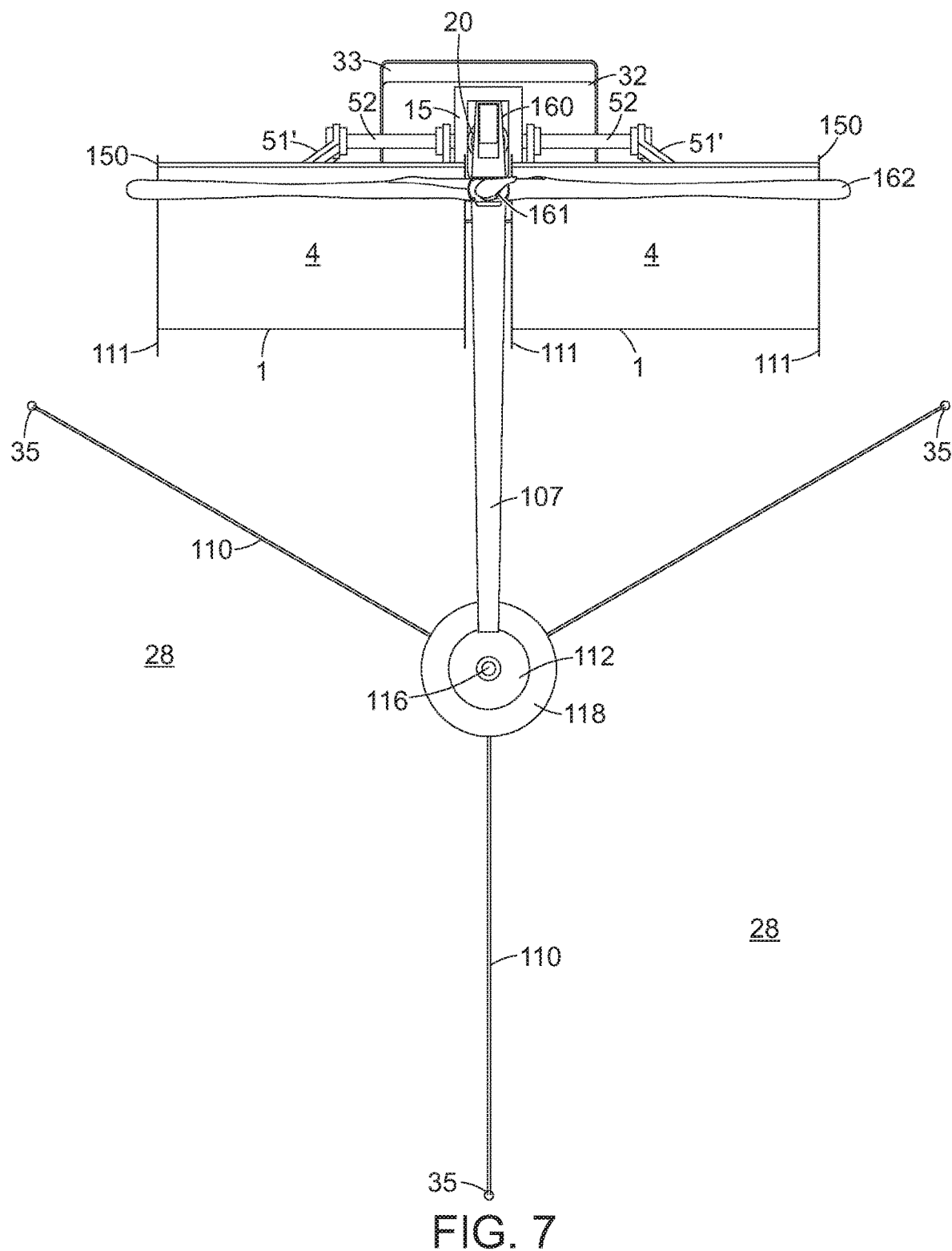
FIG. 7 is a plan view of the combined FWT-WEC apparatus shown in FIG. 5.

Referring now to FIG. 7, which shows an overhead plan view of the combined WEC-FWT embodiment shown in FIGS. 5 and 6, floats 4 can rotate on their swing or drive arms 51 above or below mooring beam 107 without interference from the float sidewalls. Collectively, FIGS. 3, 4, 5, 6, and 7 illustrate that floats 4 can rotate a complete 360° without any mechanical interference. This is highly advantageous because it avoids severe sea, end-stop collisions and the damage associated with such collisions, which is a major limitation of most other WECs. If a rogue wave or severe seas lift float 4 beyond the point where its center of gravity is aft of the drive arm 51 to PTO 15 pivot point or axis or axel 52, then the PTO motor-generator simply rotates float 4 back to its proper forward operating position. Although not mandatory, the preferred permanent magnet PTO generator (s) are also suitable for, and used as, motors, which avoids the need for an optional auxiliary motor drive.

When severe seas persist, the PTO motor-generator 15 can force floats 4 into a fully submerged position (where the float center-of-buoyancy 135 is substantially below the PTO pivot point or pivot axis or axel 52) where the floats can be safely maintained in more docile waters below the wave troughs of even extreme 15-25 meter wave conditions. Total submergence of floats 4 well below the wave troughs is further facilitated by the ability, in certain embodiments of the disclosure, to at least partially flood with seawater, at least a portion of the floats 4 interior and to use the relatively long float swing or drive arms 51 and the location of the drive arm to PTO pivot point 52 well below the SWL, combined with the ability to raise or lower the submerged depth of the base or frame 20, 109, 100, 24 by adding or removing base or frame seawater ballast from affixed or integral ballast-floatation chambers (upper and lower chambers 109 in FIGS. 6 and 100 and 24 here and in FIG. 3).

In at least some embodiments of the disclosure, the PTO motor-generator is utilized as a motor during a portion of almost every wave cycle to timely return float 4 and partially submerge it well into the next ensuing wave trough and maintain it there until wave buoyancy forces build to an a-optimal level before releasing the float to initiate each upward and aft-ward travel motion (power stroke). This is commonly referred to as PTO "reactive power" control.

Figure 8:
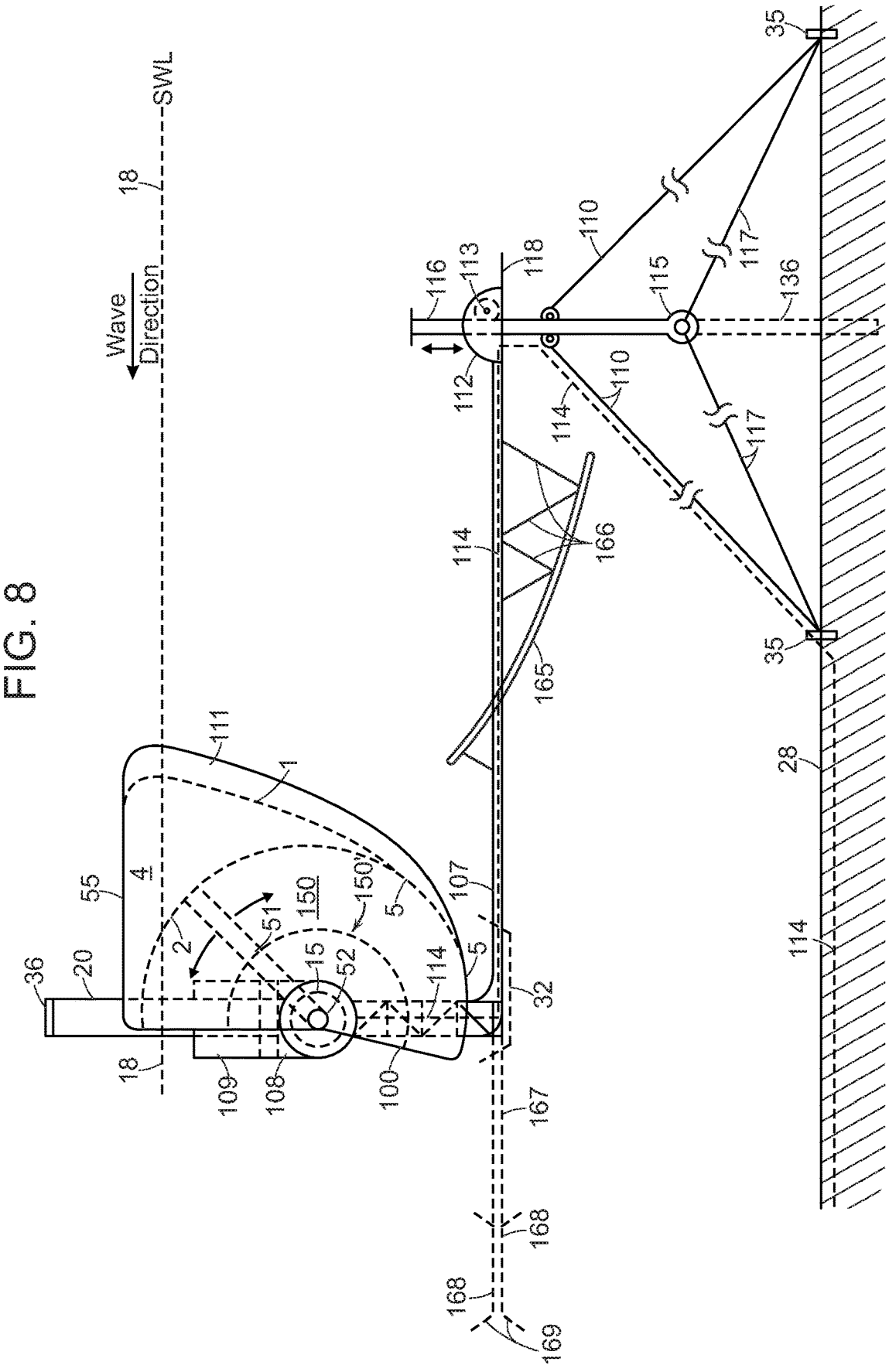
FIG. 8 is a side view in elevation of a WEC according to another embodiment of the disclosure of the present disclosure showing an optional shoaling plane preceding the floats and an optional elongated mooring buoy spar extended aft of the mono-spar base with optional attached horizontal or vertical drag plate surfaces.

Referring now to FIG. 8, which is similar to FIG. 10 of U.S. application Ser. No. 16/153,688, in another aspect of the disclosure, a WEC that incorporates many of the novel features disclosed herein is shown. Shown in FIG. 8 is an optional appendage, such as a shoaling plane or plate, 165 that precedes, and is substantially below, the WEC floats 4. Shoaling plane 165 is securely affixed to mooring beam 107 by structural members 166 or alternatively may be affixed to the base or frame (not shown). Part or all of the shoaling plate or plane 165 may be flat (not shown) or curvilinear (as shown) and may be substantially horizontal (not shown) or inclined upwardly (as shown). The port-to-starboard width or beam of shoaling plane 165 may span most or all of the width of the combined WEC floats 4. This shoaling plane protrudes deeper into the water column than the floats 4 to intercept wave energy that might otherwise pass below the WEC floats 4. Shoaling plane 165 also increases wave height, while reducing wave length, which improves wave-energy-capture efficiency for WECs more effective at capturing wave energy from shorter wave lengths (which applies to almost all WECs).

FIG. 8 also describes the optional use of substantially horizontal drag plate or plane 168 or vertical drag plate or plane 169 located substantially aft of, and mounted or supported by, a beam 167 or structure extending laterally from frame or base 100. This is similar to the WEC shown in FIG. 7 of U.S. patent application Ser. No. 16/153,688, but without an optional aft-tensioned mooring line 125. This aft location of drag plate 168 increases the moment arm and, therefore, drag plate effectiveness (vs the location of drag plate 32) against undesirable wave or wind-induced frame pitching.

While the present disclosure has been described in connection with several embodiments thereof, it will be apparent to those skilled in the art that many changes and modifications may be made without departing from the true spirit and scope of the present disclosure. Accordingly, it is intended by the appended claims to cover all such changes and modifications as come within the true spirit and scope of the disclosure.

What I claim as new and desire to secure by United States Letters Patent is:

1. A motion-stabilizing and mooring device comprising:
    a first buoyant body, wherein the first buoyant body is floating, semi-submerged, or submerged body, and has a center of buoyancy, wherein the first buoyant body, including appendages affixed to the first buoyant body, is stabilized against wave, wind, or wind-gust-induced motion, wherein the first buoyant body is selected from a group consisting of a base, a platform, a raft, a barge, a buoy, other buoyant bodies and combinations thereof;
    a second buoyant body, wherein the second buoyant body is substantially submerged, has a center of buoyancy located substantially below the center of buoyancy of the first buoyant body, and is located substantially up-sea, upwind or forward of the first buoyant body relative to oncoming waves or wind, wherein the second buoyant body is selected from the group consisting of a buoy, a spar, a mooring body and combinations thereof; and,
    at least one mooring beam affixed to, and extending from, the first buoyant body and connected to the second buoyant body at a connection point in such manner as to allow the mooring beam to pivot in a substantially horizontal or substantially vertical plane about the second buoyant body; and,
    at least one tensioned connection member selected from a group consisting of a cable, a line, a leg, a pole, a piling, a beam, a truss, a protrusion extending upwardly from the seabed and combinations thereof, wherein the at least one tensioned connection member is secured to the second buoyant body comprising at least one seabed-affixed tensioned member, which tensioned connection member results in a tensioned load in the at least one tensioned connection member produced by the buoyancy of the second buoyant body, the load being increased or decreased by the wave or wind-induced forces applied to the second buoyant body from the first buoyant body through the mooring beam.

2. The device of claim 1 wherein the connection between the at least one mooring beam and the second buoyant body and/or the connection between the second buoyant body and the at least one tensioned connection member is a mooring body horizontal plane pivotable connection is structured to allow the first buoyant body to self-orient or weathervane substantially normal to an oncoming or a prevailing wave or a wind direction, and/or wherein the connection is a substantially vertical pivotable or vertically translatable connection structured to allow the first buoyant body to remain at a relatively constant orientation relative to the still water line (SWL) or at a relatively constant submerged depth relative to the SWL as the SWL rises or falls with tidal changes.

3. The device of claim 1 wherein the first buoyant body is a base or a frame of a wave energy converter (WEC) for converting the energy of waves into electrical power; or pressurized fluid, or wherein the first buoyant body is a base or a frame of a floating wind turbine (FWT) for converting the energy of offshore winds into electrical power or useful work, or wherein the first buoyant body is a common base or frame of a combined WEC-FWT, wherein the combined WEC-FWT has a WEC component and a FWT component.

4. The device of claim 3 wherein the first buoyant body is the base or frame of a WEC having at least one base pivot connection point or pivot axis located substantially below the SWL, wherein the WEC further comprises:
    at least one buoyant float body having a center of buoyancy located substantially forward or up-sea of the base pivot point and a front face oriented substantially towards oncoming wave fronts, the at least one buoyant float body being movably connected to the base or frame at a base pivot connection point or pivot axis by at least one swing or drive arm that controls an orientation and path of a wave-induced relative motion between the at least one buoyant float and the base or frame; and,
    at least one power take-off or PTO apparatus secured to, or within, the base or frame, wherein the at least one power take-off or PTO apparatus is driven by at least one force generated by the wave-induced relative motion between the at least one buoyant float and the base or frame through the at least one swing or drive arm, and wherein the at least one power take-off or PTO apparatus may also drive motion of the at least one buoyant float during certain portions of each wave cycle.

5. The device of claim 4 wherein the at least one buoyant float body, and any adjacent buoyant float bodies, have front face oriented to, or self-orienting substantially parallel to, prevailing or oncoming wave fronts, wherein the at least one buoyant float body, and any adjacent buoyant float bodies, have a wave-front width or beam substantially exceeding a fore-to-aft dimension of the at least one buoyant float body, and any adjacent buoyant float bodies, wherein the fore-to-aft dimension excludes appendages or extensions, and wherein the at least one buoyant float body has an arcuate length and has a rear or aft side substantially concave and concentric about an at least one base pivot connection point or pivot axis for at least a major portion of the at least one buoyant body's arcuate length.

6. The device of claim 3 wherein a submerged portion of the first buoyant body contains at least one elongated, substantially vertical spar that may have seawater, gravity weights, or fixed or adjustable ballasts secured or affixed to the vertical spar, wherein the first buoyant body is constructed such that its center of buoyancy is located substantially above its center of gravity.

7. The device of claim 1 wherein the horizontal and vertical distance between the center of buoyancy of the first buoyant body and the center of buoyancy of the second buoyant body located forward and below the first buoyant body, are selected such that a moment produced by the vertical, upward, wave-heave-induced forces acting on the first buoyant body, and any attachments secured to the first buoyant body, are at least partially countered by an opposing moment produced by lateral wave-surge-induced forces plus lateral wind-induced forces, if lateral wind-induced forces are present.

8. The device of claim 1 wherein the at least one mooring beam, its connection to the first buoyant body, or its connection to the at least one tensioned connection member that connects the second buoyant body to the seabed is constructed to have a flex, spring, or energy absorption or storage sufficient to reduce shock or snap loadings on the at least one tensioned connection member caused by wave or wind-induced forces upon the first buoyant body and transmitted through the at least one mooring beam, the second buoyant body, to the at least one tensioned connection member and to the seabed.

9. The device of claim 1 further comprising a substantially vertical mooring body shaft, wherein the submerged depth of the second buoyant body can be substantially vertically adjusted to compensate for tidal changes in the SWL or sea conditions, wherein the second buoyant body submerged depth can be adjusted vertically with a motor connected to the second buoyant body, wherein the second buoyant body submerged depth can be adjusted vertically via a low-speed, self-movement of the second buoyant body vertically on the substantially vertical mooring body shaft without the motor assistance, or by adjusting the length of the at least one tensioned connection member connected to the second buoyant body without the motor assistance.

10. The device of claim 3, wherein the first buoyant body is the base or the frame of a combined WEC-FWT and comprises a wind turbine rotor having an axis of rotation and a generator, wherein a gyroscopic stabilization effect of the wind turbine rotor and the generator about the axis of rotation supplements the motion stabilization of the first buoyant body against wave or wind-induced motion provided by the at least one seabed-attached, tensioned connection member connected to the first buoyant body through the second buoyant body and the at least one mooring beam or structural member.

11. The device of claim 3, wherein the first buoyant body is the base or the frame of a combined WEC-FWT, wherein wave-induced forces acting upon the combined WEC-FWT base or frame oppose wind-induced forces acting upon the base or frame to improve motion stabilization of, and/or self-orientation of, the combined WEC-FWT base or frame.

12. The device of claim 3, wherein the first buoyant body is the base or the frame of a combined WEC-FWT, wherein the FWT component of the combined WEC-FWT has an FWT tower having a FWT tower head mass and a FWT tower mass, whereby the FWT tower head mass and the FWT tower mass, with or without additional ballast or gravity mass added to lower portions of the combined WEC-FWT, substantially increase the moment of inertia of the FWT component combined with the first buoyant body of the WEC component of the combined WEC-FWT about their combined center of gravity, which increased moment of inertia increases a natural frequency period of the combined FWT with the first buoyant body with respect to wave-induced aft pitching, which thereby increases the relative motion and energy capture efficiency of the WEC component, especially during large or long-period waves.

13. The device of claim 3 wherein energy absorbing, spring-like, or other energy storage elements within the at least one mooring beam or structural member, within the at least one mooring beam or structural member's connection to the first buoyant body, or along the at least one seabed-attached tensioned connection member are structured to delay pitch, heave, or lateral rebound of the first buoyant body from a prior wave until a subsequent wave is at least partially applying pitch, heave, or lateral forces against the first buoyant body.

14. The device of claim 4 wherein the at least one buoyant float can rotate on the at least one swing or drive arm a full 360° about its at least one base pivot connection point or pivot axis without mechanical interference or end stops.

15. The device of claim 4 further comprising a drive or swing arm pivot point or axis and the first buoyant float further comprising at least one cavity within, or attached to, the first buoyant float, wherein the at least one buoyant float can be fully submerged during severe sea conditions such that its center of buoyancy is substantially below the drive or swing arm pivot point or axis, such submergence achieved by applying a rotational force at the drive or swing arm pivot point or axis that can be assisted by at least partially flooding the at least one cavity in the at least one buoyant float with seawater, which seawater can be subsequently drained when an opposite rotational force applied to the at least one swing or drive arm raises the at least one buoyant float substantially above the SWL before resuming wave energy capture.

16. The device of claim 3 wherein the first buoyant body further comprises at least one cavity within, or attached to, the first buoyant body, wherein the at least one cavity can be controllably and partially flooded with seawater ballast to alter, adjust, or level the attitude of the first buoyant body relative to the SWL or a horizontal plane, to increase a mass of the first buoyant body to improve its stabilization against wave or wind-induced motion, or to alter a submerged depth of the first buoyant body.

17. The device of claim 1 further comprising at least one substantially horizontal or vertical-plane, or other-angle-oriented drag plate substantially rigidly attached to at least one submerged location on a first buoyant base to reduce wave or wind-induced motion, wherein the at least one drag plate can be either attached directly to the first buoyant base, or extended more remotely from the base by use of an elongated beam or support structure to increase the base-stabilizing moment of the drag plate.

18. The device of claim 3 wherein the first buoyant body functions as the base or the frame of a WEC or functions as the base or the frame of a WEC-FWT when a WEC is combined with a FWT, wherein a substantially submerged flat or curvilinear shoaling plane is affixed to the first buoyant body, the at least one mooring beam, or the second buoyant body substantially forward or up-sea of, or substantially below, the WEC's or combined WEC-FWT's at least one float or other moving element, and wherein the plane is oriented substantially horizontally or inclined upwardly fore to aft.

19. The device of claim 3 wherein the water plane area of the first buoyant body proximate to the SWL is reduced to minimize wave-induced heave forces on the first buoyant body and a frontal area of the first buoyant body proximate to the SWL is reduced to minimize wave-induced surge forces acting on the first buoyant body.

* * * * *